United States Patent Office.

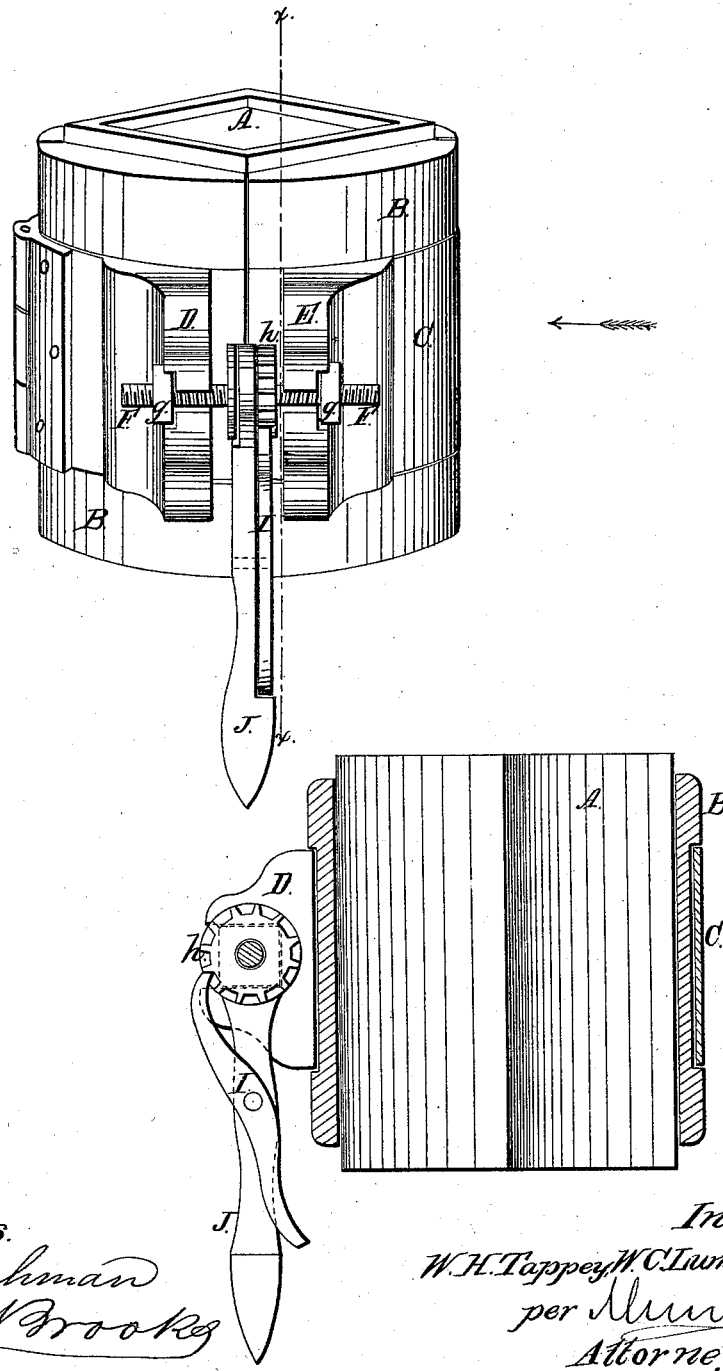

W. H. TAPPEY, W. C. LUMSDEN, AND ALEXANDER STEEL, OF PETERSBURG, VIRGINIA.

Letters Patent No. 91,985, dated June 29, 1869.

IMPROVEMENT IN TOBACCO-PRESSES.

The Schedule referred to in these Letters Patent and making part of the same.

*To all whom it may concern:*

Be it known that we, W. H. TAPPEY, W. C. LUMSDEN, and ALEXANDER STEEL, of Petersburg, in the county of Dinwiddie, and State of Virginia, have invented a new and useful Improvement in Compressing-Device; and we do hereby declare that the following is a full, clear, and exact description thereof, which will enable others skilled in the art to make and use the same, reference being had to the accompanying drawing, forming part of this specification.

This invention relates to a new and useful device designed to facilitate the operation of packing tobacco; and consists in a right and left-hand screw, which is operated by means of a lever and double ratchet-wheel and pawl, arranged as hereinafter more fully described.

In the accompanying drawing—

Figure 1 represents an outside view of the compressing-device attached to the band, as when in use.

Figure 2 is a longitudinal section of fig. 1, through the line $x$–$x$.

Similar letters of reference indicate corresponding parts.

A is the box for containing the tobacco.

B represents the sectional compressing-case around the box.

C is the compressing-band around the case B.

D E represent the heads, one of which is attached to each end of the compressing-band C.

These heads are drawn toward each other by the right and left-hand screw F, working through suitable nuts $g$ $g$, on the outside of the heads, as seen in the drawing.

$h$ is a cogged wheel, fast on the shaft F, which acts as a double ratchet.

I is a reversible pawl, pivoted to the lever or pawl-handle J.

The handle turns freely on the screw, and either end of the pawl acts upon the teeth of the ratchet, revolving the screw in either direction, according as the ratchet is used, thus tightening or loosening the band C, as may be desired.

By this arrangement, the screw is retained in any desired position.

Having thus described our invention,

What we claim as new, and desire to secure by Letters Patent, is—

The compressing-device, consisting of the band C, provided at each of its ends with the heads D E, operated by a right and left-hand screw, F, with nuts $g$, cog-wheel H, pawl I, and pawl-handle J, all combined and arranged substantially as herein set forth.

W. H. TAPPEY.
W. C. LUMSDEN.
ALEX. STEEL.

Witnesses:
R. S. BROWN,
F. J. TAPPEY.